US012681645B2

(12) United States Patent
Phadnis et al.

(10) Patent No.: US 12,681,645 B2
(45) Date of Patent: Jul. 14, 2026

(54) USING ARTIFICIAL INTELLIGENCE (AI) FOR RECONCILIATION OF MIGRATED INFORMATION

(71) Applicant: Bank of America Corporation, Charlotte, NC (US)

(72) Inventors: Rahul Phadnis, Charlotte, NC (US); Hari Vuppala, Charlotte, NC (US); Rahul Yaksh, Austin, TX (US); Pratap Dande, Saint Johns, FL (US); Elvis Nyamwange, Little Elm, TX (US); Erik Dahl, Newark, DE (US); Brian Jacobson, Los Angeles, CA (US); Sailesh Vezzu, Hillsborough, NJ (US); Amer Ali, Jersey City, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/231,381

(22) Filed: Aug. 8, 2023

(65) Prior Publication Data

US 2025/0053307 A1 Feb. 13, 2025

(51) Int. Cl.
*G06F 3/06* (2006.01)
*G06F 16/21* (2019.01)
*G06N 5/022* (2023.01)
(52) U.S. Cl.
CPC .......... *G06F 3/0619* (2013.01); *G06F 3/0647* (2013.01); *G06F 3/067* (2013.01); *G06F 16/214* (2019.01); *G06N 5/022* (2013.01)
(58) Field of Classification Search
CPC ...... G06F 3/0619; G06F 3/0647; G06F 3/067; G06F 16/214; G06N 5/022
See application file for complete search history.

(56) References Cited

U.S. PATENT DOCUMENTS 11,579,790 B1    2/2023  Vohra
11,620,233 B1    4/2023  Habusha et al.
(Continued)

OTHER PUBLICATIONS

Behm et al., "On The Migration Of Relational Schemas And Data To Object-Oriented Database Systems1," "chrome-extension:// efaidnbmnnnibpcajpcglclefindmkaj/https://citeseerx.ist.psu.edu/ document?repid=rep1&type=pdf&doi= a8fe8ee1761481f8c2fa578b06e30fee4b026dae" (Year: 1997).*

(Continued)

*Primary Examiner* — Khanh B Pham
*Assistant Examiner* — Kweku William Halm
(74) *Attorney, Agent, or Firm* — Banner & Witcoff, Ltd.

(57) ABSTRACT

A computing platform may train, using historical information migration error information, an information reconciliation engine to predict information migration errors. The computing platform may detect migration of information from a source information system to a target information system. The computing platform may generate, by inputting the information into the information reconciliation engine, a list of predicted migration errors. The computing platform may sample the migrated information to identify a list of real time migration errors. The computing platform may identify corrective actions to address the list of predicted migration errors and the list of real time migration errors. The computing platform may generate, based on the corrective actions, a configuration file. The computing platform may execute, using the configuration file and on the migrated information, a reconciliation process that remediates errors on both the list of predicted migration errors and the list of real time migration errors.

20 Claims, 8 Drawing Sheets

(56) References Cited

U.S. PATENT DOCUMENTS

| | | | |
|---|---|---|---|
| 11,625,368 B1 | 4/2023 | Kushtagi et al. | |
| 11,635,896 B2 | 4/2023 | Kim | |
| 11,720,265 B2 | 8/2023 | Ciudad et al. | |
| 11,720,274 B2 | 8/2023 | Abouelwafa et al. | |
| 11,720,535 B2 | 8/2023 | Daimler et al. | |
| 2006/0230319 A1* | 10/2006 | Ryali | G06F 11/3684 |
| | | | 714/38.14 |
| 2009/0292745 A1* | 11/2009 | Bose | G06F 16/27 |
| 2010/0057759 A1* | 3/2010 | Cotichini | G06F 16/972 |
| | | | 707/E17.009 |
| 2011/0055620 A1* | 3/2011 | Sengupta | G06F 16/93 |
| | | | 714/37 |
| 2020/0193271 A1* | 6/2020 | Allen | G06F 7/22 |
| 2021/0303547 A1* | 9/2021 | Bhargava | G06F 16/273 |
| 2023/0043733 A1 | 2/2023 | Luo et al. | |
| 2023/0045601 A1 | 2/2023 | Wang et al. | |
| 2023/0047056 A1 | 2/2023 | Chang et al. | |
| 2023/0051103 A1 | 2/2023 | Roberts et al. | |
| 2023/0060369 A1 | 3/2023 | Sivakumar et al. | |
| 2023/0087447 A1 | 3/2023 | Li et al. | |
| 2023/0110631 A1 | 4/2023 | Shetty et al. | |
| 2023/0113443 A1 | 4/2023 | Raghunathan et al. | |
| 2023/0121646 A1 | 4/2023 | Veluswamy et al. | |
| 2023/0132830 A1 | 5/2023 | Marivoet et al. | |
| 2023/0176761 A1 | 6/2023 | Biezuner et al. | |
| 2023/0179401 A1 | 6/2023 | Singh et al. | |
| 2023/0205593 A1* | 6/2023 | Goksen | G06F 9/5033 |
| | | | 718/104 |
| 2023/0246818 A1 | 8/2023 | Peddada et al. | |
| 2023/0297463 A1* | 9/2023 | Klein | G06F 16/214 |
| | | | 707/602 |
| 2024/0143390 A1* | 5/2024 | Kondapi | G06F 9/5027 |

OTHER PUBLICATIONS

Behm et al.,"OnTheMigrationOfRelationalSchemasAndDataToObject-OrientedDatabaseSystems1,""chrome-extension://efaidnbmnn-nibpcajpcglclefindmkaj/https://citeseerx.ist.psu.edu/document?repid=rep1&type=pdf&doi=a8fe8ee1761481f8c2fad578b06e30fee4b026dae"(Year: 1997) (Year: 1997).*

* cited by examiner

100

102

111

112

Information Reconciliation Platform

Processor(s)

Memory(s)

Information Reconciliation Module
112a

Information Reconciliation Database
112b

Artificial Intelligence Engine
112c

113

Communication Interface(s)

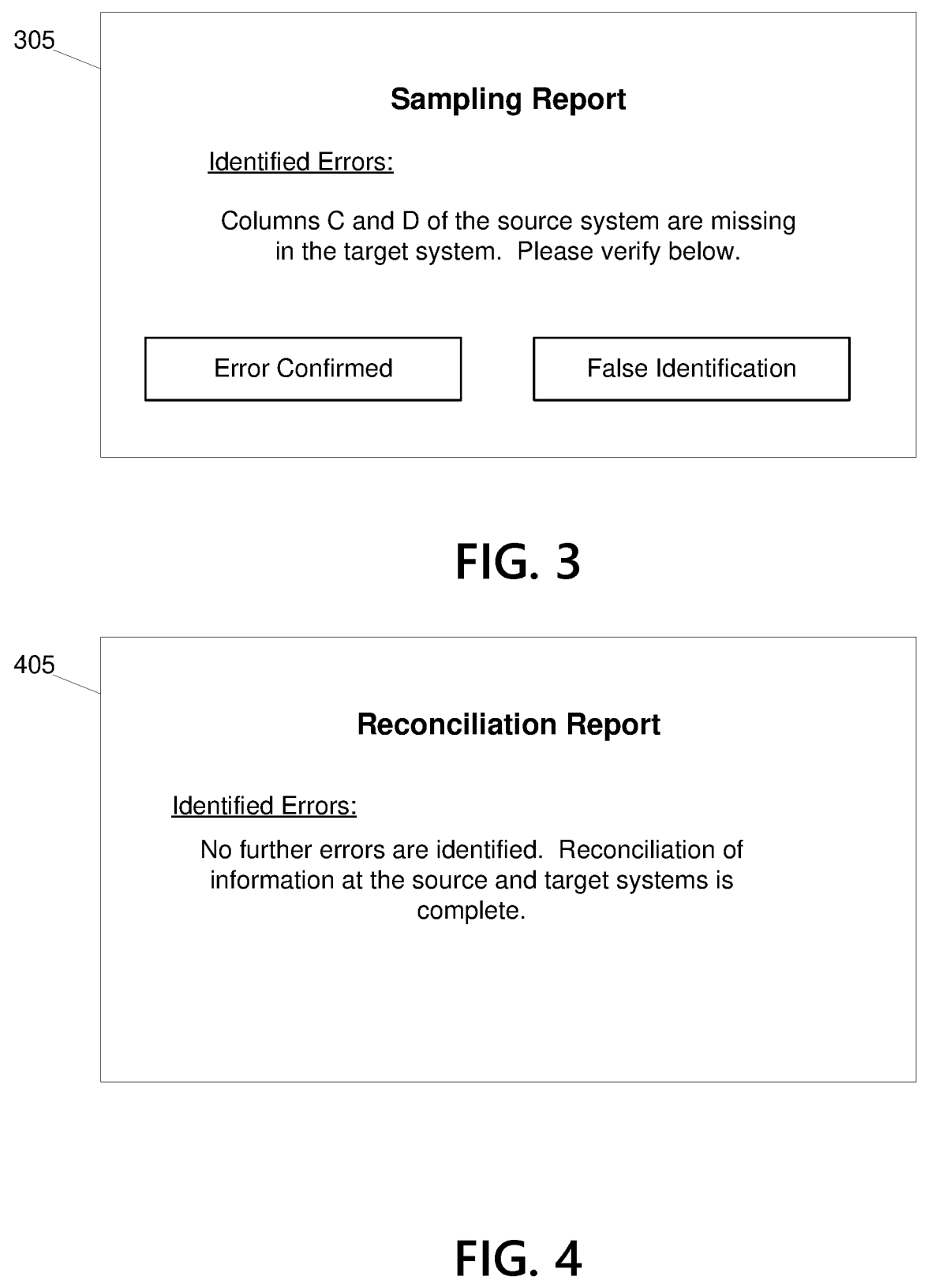

305

Sampling Report

Identified Errors:

Columns C and D of the source system are missing in the target system.  Please verify below.

| Error Confirmed | False Identification |

Reconciliation Report

Identified Errors:

No further errors are identified.  Reconciliation of information at the source and target systems is complete.

FIG. 4

USING ARTIFICIAL INTELLIGENCE (AI) FOR RECONCILIATION OF MIGRATED INFORMATION

BACKGROUND

Aspects of the disclosure relate to computer hardware and software for information migration. In some instances, information may be migrated from a source system to a target system. For example, an organization may be consolidating information, switching to new platforms, optimizing systems, seeking cost savings, or the like. There may, however, be a number of challenges in doing such migrations. For example, the migration may result in missing records, missing values, incorrect values, duplicate records, formatting errors, table/information integrity issues, or the like. As a result, such migration may be error prone, ineffective, and/or otherwise inefficient. Accordingly, it may be important to provide improved information migration.

SUMMARY

Aspects of the disclosure provide effective, efficient, scalable, and convenient technical solutions that address and overcome the technical problems associated with information migration. In one or more instances, a computing platform having at least one processor, a communication interface, and memory may train, using historical information migration error information, an information reconciliation engine to predict information migration errors. The computing platform may detect migration of information from a source information system to a target information system. The computing platform may generate, by inputting the information into the information reconciliation engine, a list of predicted migration errors. The computing platform may sample the migrated information to identify a list of real time migration errors. The computing platform may identify corrective actions to address the list of predicted migration errors and the list of real time migration errors. The computing platform may generate, based on the corrective actions, a configuration file. The computing platform may execute, using the configuration file and on the migrated information, a reconciliation process, which may remediate errors on both the list of predicted migration errors and the list of real time migration errors. The computing platform may update, using a dynamic feedback loop and based on the configuration file, the information reconciliation engine.

In one or more instances, the computing platform may train the information reconciliation engine with the historical information migration error information by training the information reconciliation engine using one or more of: migration exceptions, migration mismatches, migration error information, or migration pattern information. In one or more instances, a format corresponding to the source information system may be different than a format corresponding to the target information system, and the difference may be based on one or more of: different schema structures, variations in table definitions, variations in column names, variations in data types, variations in constraints, or variations in data dependencies.

In one or more examples, the computing platform may generate the list of predicted migration errors by: 1) identifying, using the information reconciliation engine and based on one or more of: the source information system, the target information system, and the information, a correlation with one or more historical migrations; and 2) identifying, using the information reconciliation engine and based on the correlation with the one or more historical migrations, the list of predicted migration errors. In one or more examples, identifying the correlation with the one or more historical migrations may include identifying correlations with one or more of: source information systems corresponding to different formats than the source information system, or target information systems corresponding to different formats than the target information system.

In one or more instances, identifying the list of predicted migration errors and the list of real-time errors may include identifying one or more of: missing records, missing rows, missing values, incorrect values, duplicate records, formatting issues, or broken relationships. In one or more instances, identifying the corrective actions may include automatically identifying the corrective actions based on the historical information migration error information, the migrated information, and the errors.

In one or more examples, identifying the corrective actions may include identifying the corrective actions based on user input. In one or more examples, executing the reconciliation process may include causing execution of the corrective actions on the migrated information at the target information system.

In one or more instances, the computing platform may detect migration of additional information from the source information system to the target information system. The computing platform may generate, by inputting the additional information into the information reconciliation engine, an updated list of predicted migration errors, which may include both the list of predicted migration errors and the list of real time migration errors. The computing platform may update, prior to sampling the additional migration information, the additional migration information to address the updated list of predicted migration errors.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3-4 depict illustrative user interfaces for using AI for reconciliation of migrated information in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods for improved information migration are described herein. For example, information may be transferred from one database technology to another. It may be time consuming, expensive, and complex to build/perform reconciliations to ensure the information is migrated seamlessly and without errors. Any errors or inaccuracies in migrations may have revenue leakage and significant financial, reputational, and/or regulatory implications.

Described herein is a comprehensive tool that completely automates information reconciliation between systems using AI. An AI model may be built and trained on the metadata of the systems, information exceptions, information mismatches, historical migrations, information sampling, various information patterns/types, or the like. The AI information reconciler may be designed to operate using a specific set of parameters that may be dependent on the details of the database systems. The tool may sample the metadata related to the database systems to create an initial assessment report. The process owner may review the report and provide feedback to the system, thereby confirming the reconciler configuration. The configuration details may be leveraged to perform the reconciliation between the two systems. The process may then produce a reconciliation report highlighting errors, issues, and discrepancies.

Figure 1A:
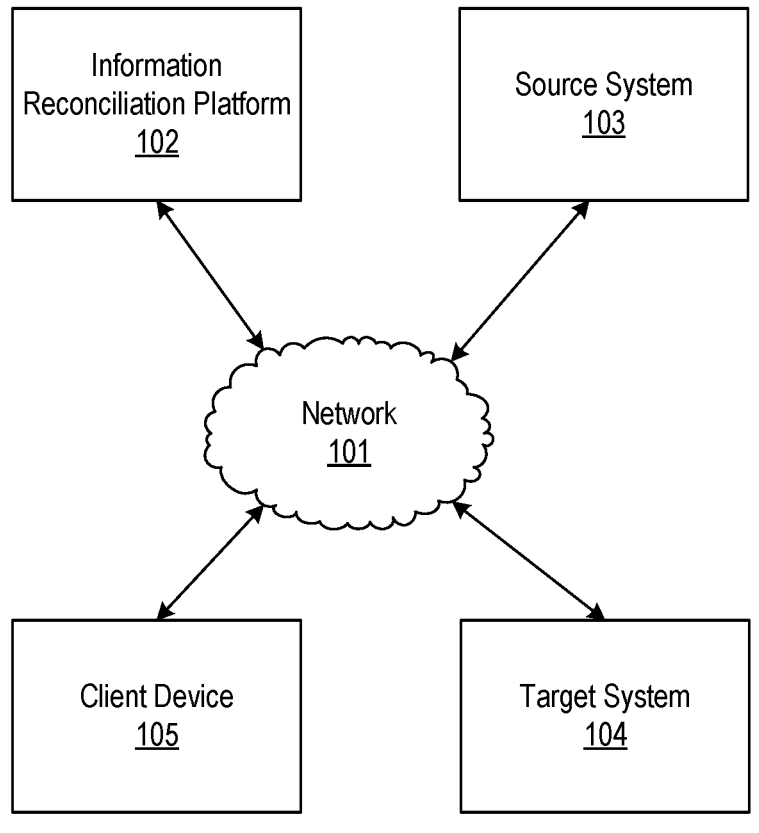
FIGS. 1A-1B depict an illustrative computing environment for using AI for reconciliation of migrated information in accordance with one or more example embodiments.
Figure 1B:
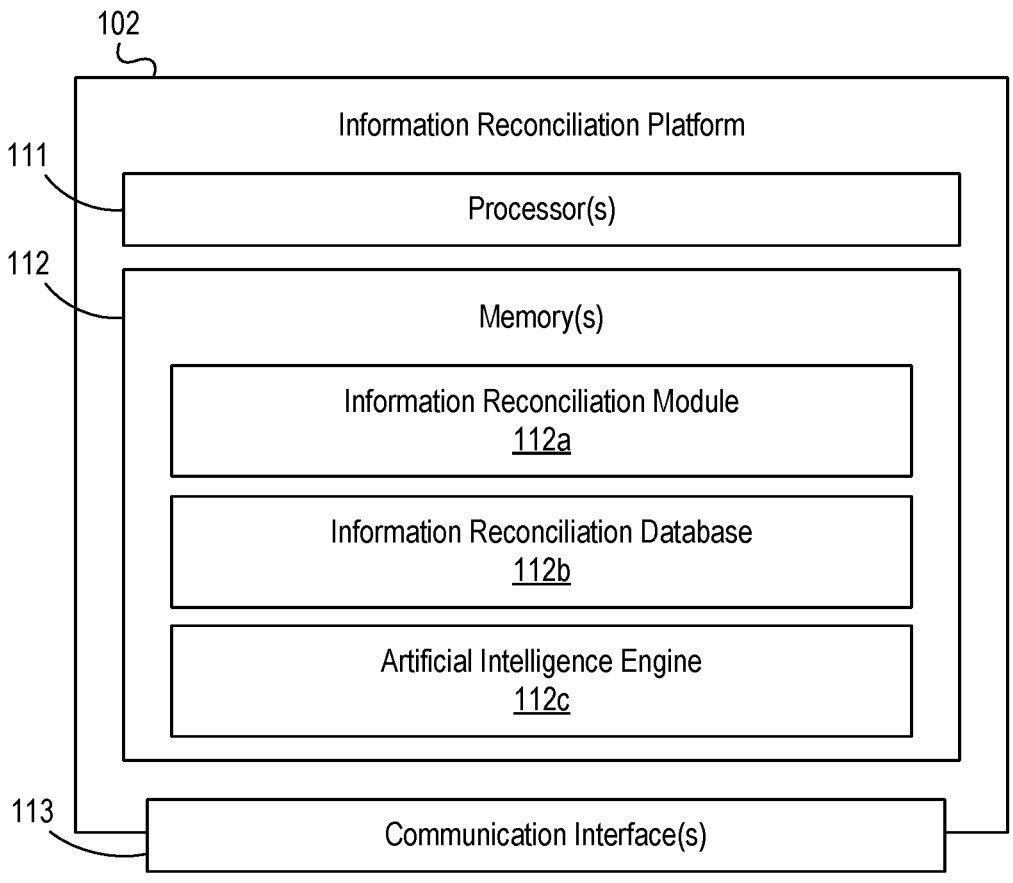

FIGS. 1A-1B depict an illustrative computing environment for using AI for reconciliation of migrated information in accordance with one or more example embodiments. Referring to FIG. 1A, computing environment 100 may include one or more computer systems. For example, computing environment 100 may include an information reconciliation platform 102, source system 103, target system 104, and client device 105.

As described further below, information reconciliation platform 102 may be a computer system that includes one or more computing devices (e.g., servers, server blades, or the like) and/or other computer components (e.g., processors, memories, communication interfaces) that may be used to provide information reconciliation services. For example, information reconciliation platform 102 may be configured to train, host, and/or otherwise maintain an AI engine that may be used for automated error prediction, identification, and remediation.

Source system 103 may be a computer system that includes one or more computing devices (e.g., servers, server blades, or the like) and/or other computer components (e.g., processors, memories, communication interfaces, or the like). For example, the source system 103 may be configured to store information, which may, e.g., be configured according to a first format, schema structure, or the like, and may have associated table definitions, column names, data types, constraints, data dependencies, or the like. In these instances, the source system 103 may store information to be migrated to a target system (e.g., target system 104).

Target system 104 may be a computer system that includes one or more computing devices (e.g., servers, server blades, or the like) and/or other computer components (e.g., processors, memories, communication interfaces, or the like). For example, the target system 104 may be configured to store information, which may, e.g., be configured according to a second format, scheme structure, or the like, and may have associated table definitions, column names, data types, constraints, data dependencies, or the like (which may, e.g., be different than those described above with regard to the source system 103). In these instances, the target system 104 may receive information (e.g., from the source system 103) via an information migration.

Client device 105 may be and/or otherwise include a laptop computer, desktop computer, mobile device, tablet, smartphone, and/or other device that may be used by an individual (such as an employee of an enterprise organization). In some instances, client device 105 may be configured to display one or more user interfaces (e.g., sampling report interfaces, reconciliation report interfaces, or the like).

Although a single client device 105, source system 103, and target system 104 are shown, any number of user devices may be deployed in the systems/methods described below without departing from the scope of the disclosure.

Computing environment 100 also may include one or more networks, which may interconnect information reconciliation platform 102, source system 103, target system 104, client device 105, or the like. For example, computing environment 100 may include a network 101 (which may interconnect, e.g., information reconciliation platform 102, source system 103, target system 104, client device 105, or the like).

In one or more arrangements, information reconciliation platform 102, source system 103, target system 104, and client device 105 may be any type of computing device capable of sending and/or receiving requests and processing the requests accordingly. For example, information reconciliation platform 102, source system 103, target system 104, client device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of information reconciliation platform 102, source system 103, target system 104, and/or client device 105 may, in some instances, be special-purpose computing devices configured to perform specific functions.

Referring to FIG. 1B, information reconciliation platform 102 may include one or more processors 111, memory 112, and communication interface 113. A data bus may interconnect processor 111, memory 112, and communication interface 113. Communication interface 113 may be a network interface configured to support communication between information reconciliation platform 102 and one or more networks (e.g., network 101, or the like). Memory 112 may include one or more program modules having instructions that when executed by processor 111 cause information reconciliation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of information reconciliation platform 102 and/or by different computing devices that may form and/or otherwise make up information reconciliation platform 102. For example, memory 112 may have, host, store, and/or include information reconciliation module 112a, information reconciliation database 112b, and/or artificial intelligence engine 112c.

Information reconciliation module 112a may have instructions that direct and/or cause information reconciliation platform 102 to provide improved information migration and reconciliation techniques, as discussed in greater detail below. Information reconciliation database 112*b* may store information used by information reconciliation module 112*a* and/or information reconciliation platform 102 in application of advanced techniques to provide improved information reconciliation and migration services, and/or in performing other functions. Artificial intelligence engine 112*c* may train, host, and/or otherwise refine a model that may be used to perform dynamic information reconciliation and migration, and/or other functions.

Figure 2A:
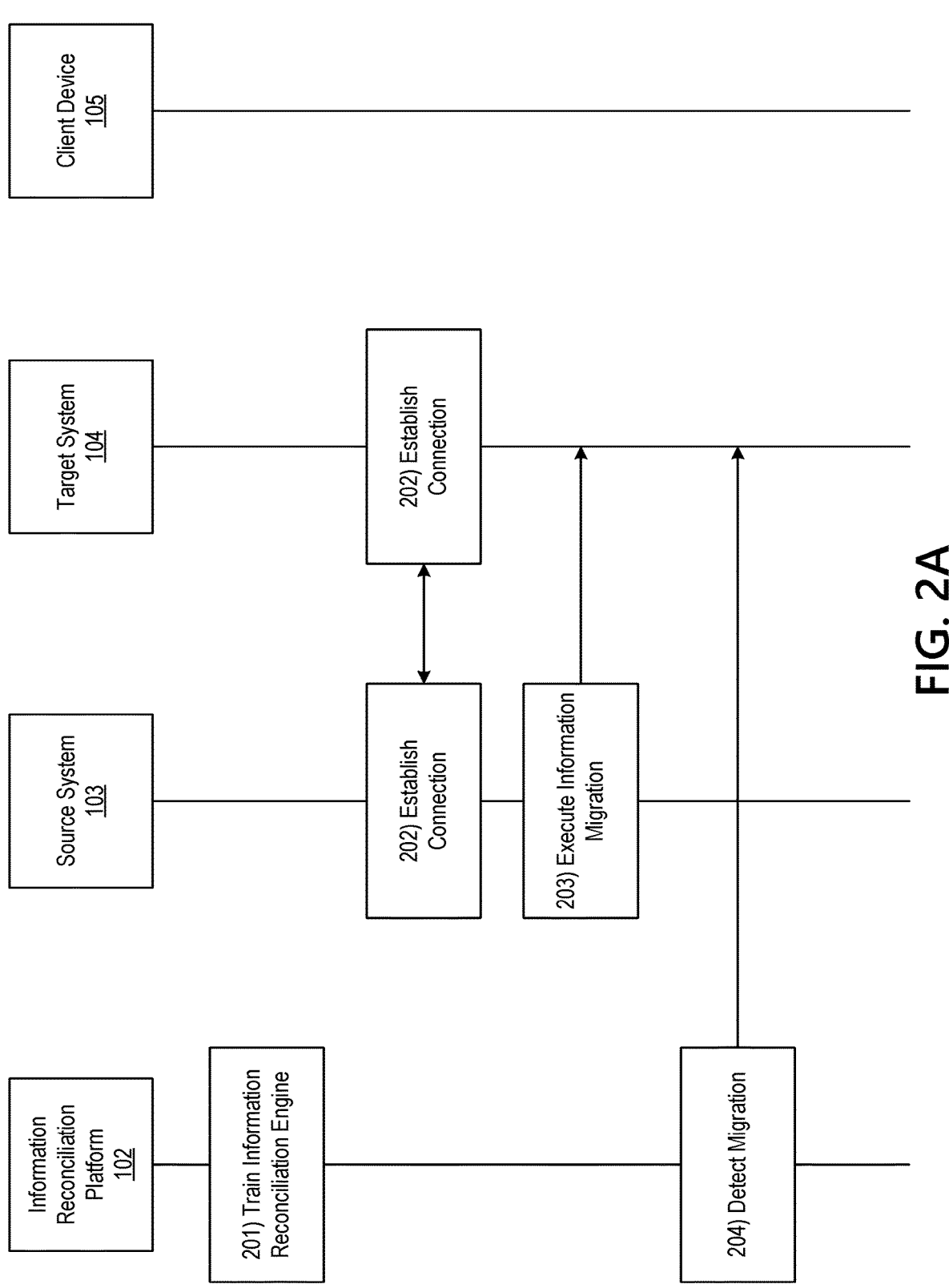
FIGS. 2A-2D depict an illustrative event sequence for using AI for reconciliation of migrated information in accordance with one or more example embodiments.

FIGS. 2A-2D depict an illustrative event sequence for using AI for reconciliation of migrated information in accordance with one or more example embodiments. Referring to FIG. 2A, at step 201, the information reconciliation platform 102 may train an AI engine (e.g., an information reconciliation model). For example, the information reconciliation platform 102 may train the information reconciliation model to identify predicted errors resulting from information migrations between various systems (e.g., source system 103, target system 104, or the like). For example, the information reconciliation platform 102 may receive historical migration information, system metadata, and/or other information. For example, the information reconciliation platform 102 may receive format information, schema structure information, table definitions, column names, data types, constraints, data dependencies, data exceptions, data mismatches, historical migration error information, sampling information, data patterns/types, and/or other information. The information reconciliation platform 102 may input the information into the information reconciliation model to train the information reconciliation model to establish stored correlations between such information and the systems involved in the corresponding migrations. In doing so, the information reconciliation platform 102 may train the information reconciliation model to identify, based on a given migration, corrective actions that may be performed to address any predicted and/or otherwise identified migration errors.

In some instances, in training the information reconciliation model, the information reconciliation platform 102 may train the information reconciliation model to identify a confidence score for given errors (e.g., indicating a confidence that a predicted error will occur) and/or the corresponding corrective actions (e.g., indicating a confidence that the corrective action will remediate the predicted error). In some instances, the information reconciliation model may be trained to compare these confidence scores to one or more thresholds, and select the corresponding predicted errors/corrected actions if their corresponding confidence scores meet or exceed the given thresholds.

In some instances, in training the resource allocation model, the information reconciliation platform 102 may train a supervised learning model (e.g., decision tree, bagging, boosting, random forest, neural network, linear regression, artificial neural network, support vector machine, and/or other supervised learning model), unsupervised learning model (e.g., classification, clustering, anomaly detection, feature engineering, feature learning, and/or other unsupervised learning models), and/or other model.

At step 202, the source system 103 may establish a connection with the target system 104. For example, the source system 103 may establish a first wireless data connection with the target system 104 to link the source system 103 to the target system 104 (e.g., in preparation for executing an information migration). In some instances, the source system 103 may identify whether or not a connection is already established between the source system 103 and the target system 104. If a connection is already established, the source system 103 might not re-establish the connection. Otherwise, if a connection is not yet established, the source system 103 may establish the first wireless data connection as described herein.

At step 203, the source system 103 may execute an information migration from the source system 103 to the target system 104 (e.g., via the first wireless data connection). In some instances, in doing so, formatting and/or other parameters of the information may be modified to comply with the structure, format, schema, or the like of the target system 104 (which may, e.g., be different than that of the source system 103). In some instances, in doing so, there may be errors in the information that result from the migration. For example, the migrated information may include missing records, missing values, incorrect values, duplicate records, formatting errors, broken integrity between information/tables, and/or other errors.

At step 204, the information reconciliation platform 102 may monitor the target system 104 to detect the migration. Additionally or alternatively, the information reconciliation platform 102 may receive notifications from the source system 103 and/or the target system 104 indicating that the migration has occurred.

Figure 2B:
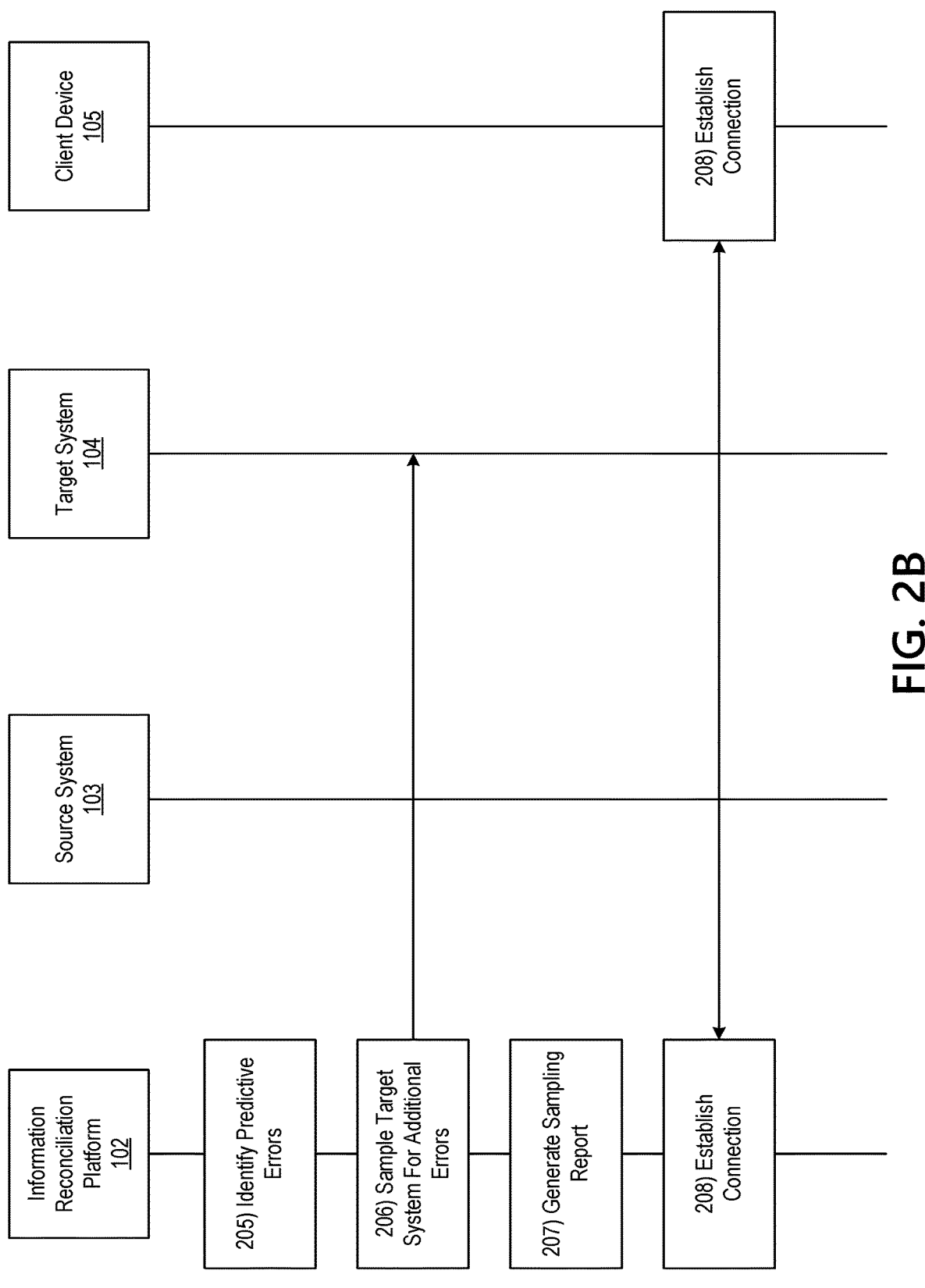

Referring to FIG. 2B, at step 205, the information reconciliation platform 102 may identify predicted errors in the migration. For example, before analyzing the migrated information itself to identify any real time errors, the information reconciliation platform 102 may predict errors that likely occurred during the migration. For example, the information reconciliation platform 102 may input metadata, parameters, or the like corresponding to the source system 103, target system 104, and migrated information into the information reconciliation model to identify predicted errors (and/or corresponding actions). For example, the information reconciliation model may output a number of predicted errors and the corresponding corrective actions, and may compare confidence scores associated with the predicted errors to a confidence threshold. For predicted errors with confidence scores that meet or exceed the confidence threshold, the information reconciliation model may add the predicted errors and their corresponding corrective actions to a predicted errors list (whereas predicted errors with confidence scores that do not meet or exceed the confidence threshold might not be added).

In some instances, in identifying the predicted errors, the information reconciliation platform 102 may identify the predicted errors based on historical migrations between the source system 103 and the target system 104. In other instances, the information reconciliation platform 102 may identify the predicted errors based on historical migrations between different systems, which may e.g., be similar (e.g., at least a predetermined amount of matching parameters, metadata, formats, or the like) to the source system 103 and/or the target system 104.

In some instances, this list of predicted errors and their corresponding corrective actions may be used to modify the migrated information (as is described further below). In some instances, once the predicted errors and their corresponding corrective actions have been identified, the migrated information may be modified accordingly (e.g., using the corrective actions) to remediate the predicted errors at step 205 (e.g., rather than awaiting execution of the information sampling as is described further below and illustrated in the event sequence). To clarify these two scenarios, these predicted errors may be remediated by the information reconciliation platform 102 immediately upon identification, or once real time errors have been identified (and thus the real time errors and predicted errors may both be addressed together).

Although step 205 is illustrated as being performed once the migration has occurred, it may, in some instances, be performed prior to or during the migration. In these instances, the list of predicted errors and their corresponding corrective actions may be used to adjust the information prior to the migration to avoid the occurrence of such errors (e.g., the errors may be pre-emptively addressed).

At step 206, the information reconciliation platform 102 may sample the target system 104 for additional (e.g., real time) errors. For example, the information reconciliation platform 102 may select a random (or select) sampling of the migrated information, and compare it against the original information (from the source system 103). The information reconciliation platform 102 may then add any identified errors to a list of real time errors. In doing so, the information reconciliation platform 102 may identify a majority of the errors resulting from the migration, without performing a comprehensive analysis of the migrated information (thus conserving processing power and resources).

At step 207, information reconciliation platform 102 may generate a sampling report. For example, the information reconciliation platform 102 may generate a report that includes the additional/real time errors identified at step 206. In some instances, the information reconciliation platform 102 may also include the predicted errors (identified at step 205) in the sampling report.

At step 208, the information reconciliation platform 102 may establish a second wireless connection with the client device 105. For example, the information reconciliation platform 102 may establish a second wireless connection with the client device 105 to link the information reconciliation platform 102 to the client device 105 (e.g., in preparation for sending reports). In some instances, the information reconciliation platform 102 may identify whether or not a connection is already established with the client device 105. If a connection is already established, the information reconciliation platform 102 might not re-establish the connection. Otherwise, if the connection is not yet established, the information reconciliation platform 102 may establish the second wireless data connection as described herein.

Figure 2C:
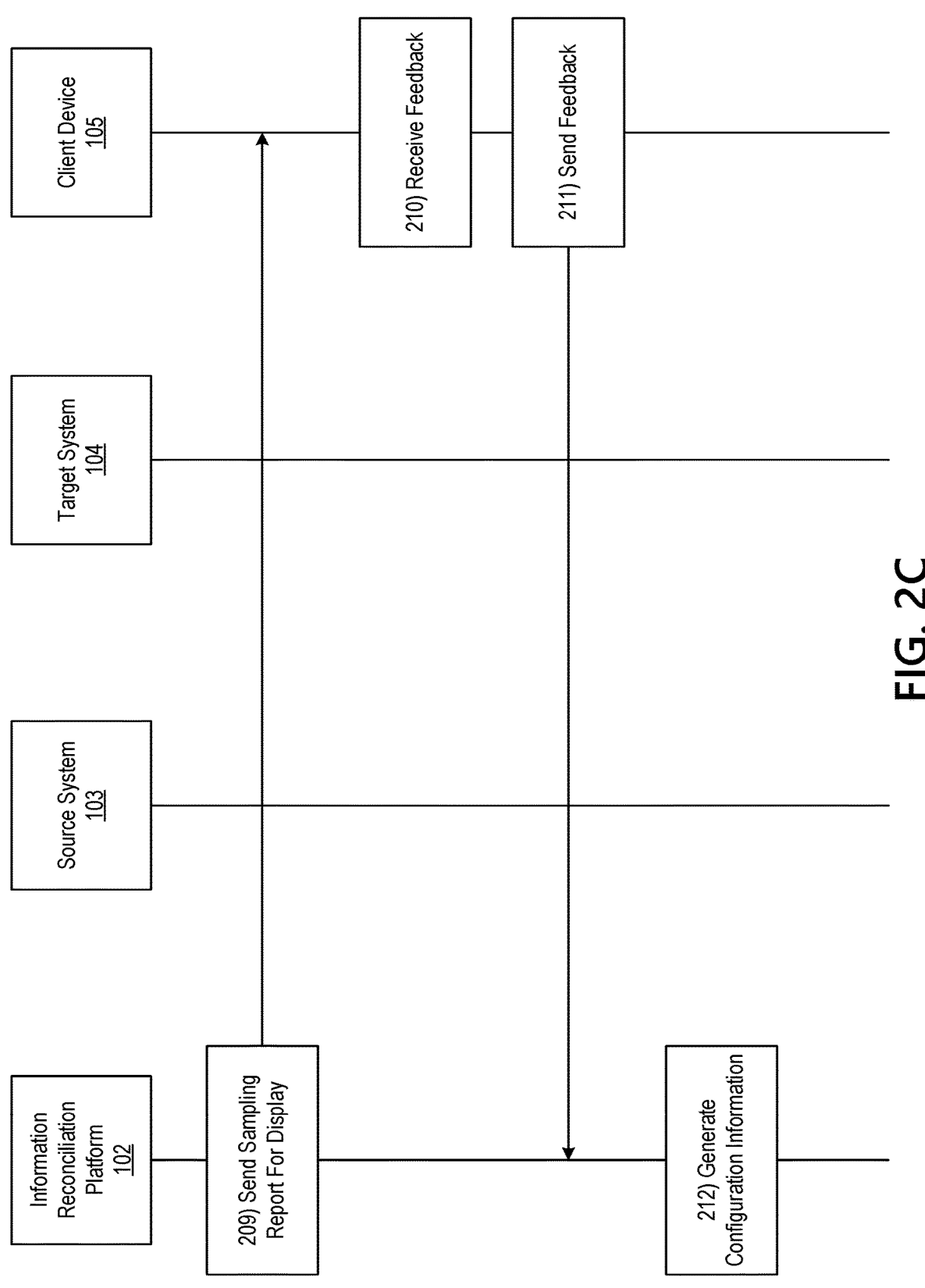

Referring to FIG. 2C, at step 209, the information reconciliation platform 102 may send the sampling report (generated at step 209) to the client device 105. For example, the information reconciliation platform 102 may send the sampling report via the communication interface 113 and while the second wireless data connection is established. In some instances, the information reconciliation platform 102 may also send one or more commands directing the client device 105 to display the sampling report (which may, e.g., cause the client device 105 to display the sampling report). For example, the information reconciliation platform 102 may display a graphical user interface similar to graphical user interface 305, which is illustrated in FIG. 3. For example, the graphical user interface 305 may prompt for confirmation of an identified error. Additionally, in some instances, the graphical user interface 305 may prompt a user to input a corrective action corresponding to the identified error.

At step 210, the client device 105 may receive feedback via the graphical user interface 305. For example, the client device 105 may receive the feedback confirming identified errors, inputting corrective actions, or the like.

At step 211, the client device 105 may send the feedback to the information reconciliation platform 102. For example, the client device 105 may send the feedback while the second wireless data connection is established.

In addition or as an alternative to receiving the feedback from a user of the client device 105 (e.g., as described with regard to steps 209-211), the information reconciliation platform 102 may, in some instances, automatically identify corrective actions (e.g., using the information reconciliation model).

At step 212, the information reconciliation platform 102 may receive the feedback and generate configuration information, which may, e.g., include the additional (real time) errors and their corresponding corrective actions. In some instances, the information reconciliation platform 102 may further generate the configuration information based on the predicted errors (e.g., in instances where such errors have not yet been remediated). For example, the configuration information may provide instructions for reconciling the migrated information with the original information (and subsequently updating the information reconciliation model).

Figure 2D:
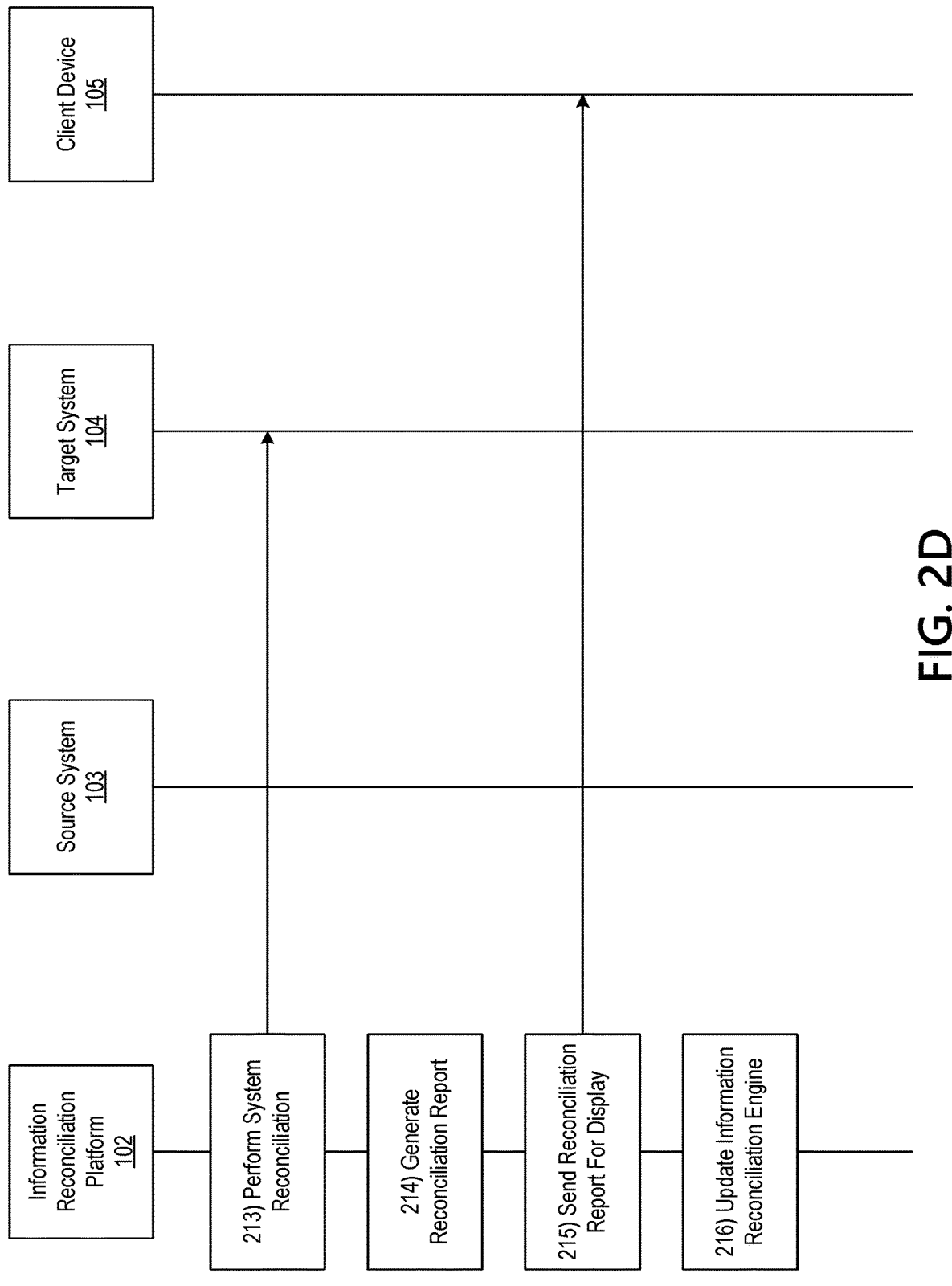

Referring to FIG. 2D, at step 213, the information reconciliation platform 102 may perform reconciliation of the migrated information at the target system 104. For example, the information reconciliation platform 102 may perform the corrective actions to remediate the additional (real time) errors and/or the predicted errors. For example, the information reconciliation platform 102 may identify the corrective actions/errors based on the configuration information. In some instances, in performing the reconciliation, the information reconciliation platform 102 may adjust the migrated information to correct for missing records, missing values, incorrect values, duplicate records, formatting errors, broken integrity between data/tables, or the like.

At step 214, the information reconciliation platform 102 may generate a reconciliation report based on the reconciled migration information. For example, the information reconciliation platform 102 may now perform a comprehensive comparison (e.g., in contrast to the sampling that was performed at step 206) of the reconciled migrated information to the original information to identify whether there are any remaining discrepancies/errors.

At step 215, the information reconciliation platform 102 may send the reconciliation report to the client device 105 via the communication interface 113 and while the second wireless data connection is established. In some instances, the information reconciliation platform 102 may also send one or more commands directing the client device 105 to display the reconciliation report (which may, e.g., cause the client device 105 to display the reconciliation report). For example, the client device 105 may display a graphical user interface similar to graphical user interface 405, which is illustrated in FIG. 4. In some instances, the reconciliation report may indicate that no additional errors/discrepancies remain, or that an error/discrepancy was identified. If no additional errors/discrepancies are identified, the information reconciliation platform 102 may identify that reconciliation of the migrated information is completed, and may proceed to step 216. If additional errors/discrepancies are identified, the event sequence may return to step 210, where feedback indicating corrective actions may be received and/or corrective actions may be automatically identified by the information reconciliation model.

At step 216, the information reconciliation platform 102 may update the information reconciliation model based on the configuration information (which includes, e.g., the identified errors and corresponding corrective actions), the original and/or migrated information, the user feedback, the source system 103, the target system 104, and/or other information. In doing so, the information reconciliation platform 102 may continue to refine the information reconciliation model using a dynamic feedback loop, which may, e.g., increase the accuracy and effectiveness of the model in performing/facilitating information reconciliation and migration.

For example, the information reconciliation platform 102 may use the configuration information, the original and/or migrated information, the user feedback, the source system 103, the target system 104, and/or other information to reinforce, modify, and/or otherwise update the information reconciliation model, thus causing the model to continuously improve (e.g., in terms of performing error identification and corrective actions).

In some instances, the information reconciliation platform 102 may continuously refine the information reconciliation model. In some instances, the information reconciliation platform 102 may maintain an accuracy threshold for the information reconciliation model, and may pause refinement (through the dynamic feedback loops) of the model if the corresponding accuracy is identified as greater than the corresponding accuracy threshold. Similarly, if the accuracy fails to be equal or less than the given accuracy threshold, the information reconciliation platform 102 may resume refinement of the model through the corresponding dynamic feedback loop.

In doing so, subsequent migrations may be analyzed by the information reconciliation model based on the configuration information identified above, and thus predictive error detection may continuously improve.

By operating in this way, the information reconciliation platform 102 may efficiently and effectively facilitate information migrations from source to target systems. By using the information reconciliation model, the information reconciliation platform 102 may improve the accuracy of error/discrepancy detection. Furthermore, by using the multi-tiered approach in which predicted errors may be identified and/or addressed, then performing random sampling to identify/address real time errors, a majority of the errors/discrepancies may be identified/addressed without performing a comprehensive analysis of the migrated information. Then, the comprehensive reconciliation may result in few (or no) errors, which may be remediated in turn.

Figure 5:
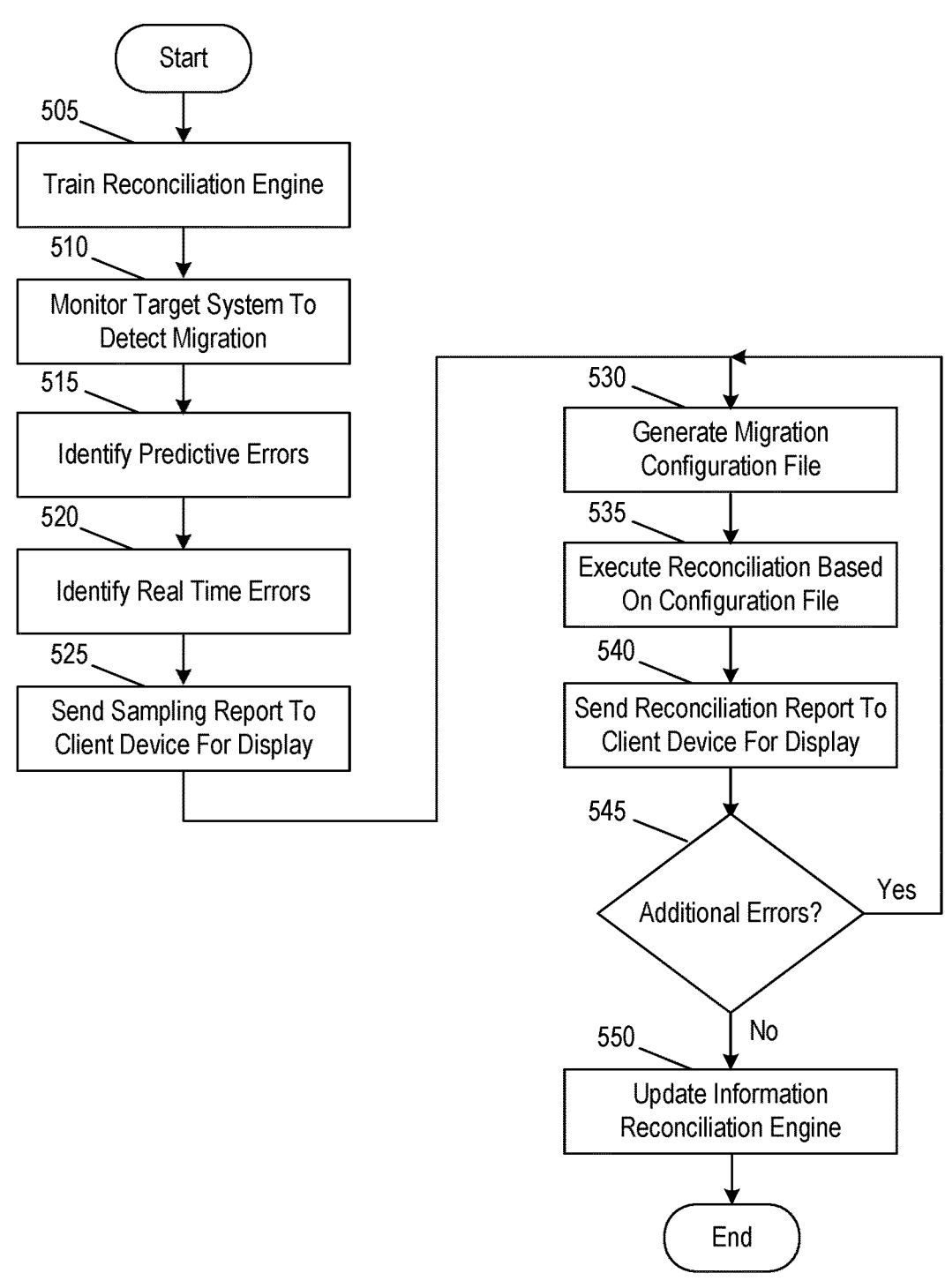
FIG. 5 depicts an illustrative method for using AI for reconciliation of migrated information in accordance with one or more example embodiments.

FIG. 5 depicts an illustrative method for using AI for reconciliation of migrated information in accordance with one or more example embodiments. At step 505, a computing platform having at least one processor, a communication interface, and memory may train, using historical migration information, system parameters, and/or other information, an information reconciliation model. For example, the computing platform may train the information reconciliation model to predict migration errors and corresponding corrective actions. At step 510, the computing platform may monitor a target system to detect a migration. At step 515, the computing platform may identify predicted errors for the migration. For example, the computing platform may feed information of the migration, the source system, the target system, and/or other information into the information reconciliation model to predict corresponding errors and/or corrective actions. At step 520, the computing platform may perform sampling of the migrated information to identify real time errors. For example, the computing platform may identify errors that occurred through the migration, but that were not predicted in advance of the sampling/sampling. At step 525, the computing platform may generate a sampling report that includes the errors (predicted, real time, or the like) and any corresponding corrective actions, and may send the report to a client device for display. At step 530, the computing platform may generate a configuration file, which may include the errors, the corrective actions, and any additional corrective actions to be performed based on feedback received on the sampling report (and/or otherwise automatically identified). At step 535, the computing platform may execute a reconciliation process for the target system based on the configuration file. For example, the computing platform may cause execution of the identified corrective actions to address the identified errors. At step 540, the computing platform may generate and send a reconciliation report (indicating the presence of any remaining errors) to the client device for display.

At step 545, the computing platform may identify whether there are any remaining errors/discrepancies at the target system. If there are additional errors, the computing platform may return to step 530 to update the configuration file based on the additional errors and any corresponding corrective actions. Otherwise, if there are no additional errors, the computing platform may proceed to step 550. At step 550, the computing platform may update the information reconciliation model based on the configuration file (including any errors/corrective actions defined therein), the information, the source system, the target system, and/or other information using a dynamic feedback loop.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
train, using historical information migration error information, an information reconciliation engine to predict information migration errors, wherein:
the information reconciliation engine is an artificial intelligence engine, and
the artificial intelligence engine comprises: a decision tree model, bagging model, boosting model, random forest model, neural network, artificial neural network, support vector machine, classification model, clustering model, anomaly detection model, feature engineering model, and feature learning model;
detect migration of information from a source information system to a target information system, wherein a format corresponding to the source information system is different than a format corresponding to the target information system, and wherein the difference is based on different schema structures, variations in table definitions, variations in column names, variations in data types, variations in constraints, and variations in data dependencies;
generate, by inputting the migrated information into the information reconciliation engine, a list of predicted migration errors;
sample the migrated information to identify a list of real-time migration errors, wherein identifying the list of predicted migration errors and the list of real-time migration errors comprises identifying: missing records, missing rows, missing values, incorrect values, formatting issues, and broken relationships, wherein sampling the migrated information comprises selecting a random subset of the migrated information without reviewing the migrated information in its entirety;
identify corrective actions to address the list of predicted migration errors and the list of real-time migration errors;
generate, based on the corrective actions, a configuration file;
execute, using the configuration file and on the migrated information, a reconciliation process, wherein the reconciliation process remediates errors on both the list of predicted migration errors and the list of real-time migration errors; and
update, using a dynamic feedback loop and based on the configuration file, the information reconciliation engine.

2. The computing platform of claim 1, wherein training the information reconciliation engine with the historical information migration error information comprises training the information reconciliation engine using: migration exceptions, migration mismatches, migration error information, and migration pattern information.

3. The computing platform of claim 1, wherein generating the list of predicted migration errors comprises:
identifying, using the information reconciliation engine and based on one or more of: the source information system, the target information system, and the migrated information, a correlation with one or more historical migrations; and
identifying, using the information reconciliation engine and based on the correlation with the one or more historical migrations, the list of predicted migration errors.

4. The computing platform of claim 3, wherein identifying the correlation with the one or more historical migrations includes identifying correlations with one or more of: source information systems corresponding to different formats than the source information system, or target information systems corresponding to different formats than the target information system.

5. The computing platform of claim 1, wherein identifying the corrective actions comprises automatically identifying the corrective actions based on the historical information migration error information, the migrated information, and the errors.

6. The computing platform of claim 1, wherein identifying the corrective actions comprises identifying the corrective actions based on user input.

7. The computing platform of claim 1, wherein executing the reconciliation process comprises causing execution of the corrective actions on the migrated information at the target information system.

8. The computing platform of claim 1, wherein the memory stores additional computer-readable instructions that, when executed by the at least one processor, cause the computing platform to:
detect migration of additional information from the source information system to the target information system;
generate, by inputting the additional information into the information reconciliation engine, an updated list of predicted migration errors, wherein the updated list of predicted migration errors include both the list of predicted migration errors and the list of real time migration errors; and

update, prior to sampling the additional information, the additional information to address the updated list of predicted migration errors.

9. A method comprising:

at a computing platform comprising at least one processor, a communication interface, and memory:

training, using historical information migration error information, an information reconciliation engine to predict information migration errors, wherein:

the information reconciliation engine is an artificial intelligence engine, and the artificial intelligence engine comprises: a decision tree model, bagging model, boosting model, random forest model, neural network, artificial neural network, support vector machine, classification model, clustering model, anomaly detection model, feature engineering model, and feature learning model;

detecting migration of information from a source information system to a target information system, wherein a format corresponding to the source information system is different than a format corresponding to the target information system, and wherein the difference is based on different schema structures, variations in table definitions, variations in column names, variations in data types, variations in constraints, and variations in data dependencies;

generating, by inputting the migrated information into the information reconciliation engine, a list of predicted migration errors;

sampling the migrated information to identify a list of real-time migration errors, wherein identifying the list of predicted migration errors and the list of real-time migration errors comprises identifying: missing records, missing rows, missing values, incorrect values, formatting issues, and broken relationships, wherein sampling the migrated information comprises selecting a random subset of the migrated information without reviewing the migrated information in its entirety;

identifying corrective actions to address the list of predicted migration errors and the list of real-time migration errors;

generating, based on the corrective actions, a configuration file;

executing, using the configuration file and on the migrated information, a reconciliation process, wherein the reconciliation process remediates errors on both the list of predicted migration errors and the list of real-time migration errors; and updating, using a dynamic feedback loop and based on the configuration file, the information reconciliation engine.

10. The method of claim 9, wherein training the information reconciliation engine with the historical information migration error information comprises training the information reconciliation engine using: migration exceptions, migration mismatches, migration error information, and/or migration pattern information.

11. The method of claim 9, wherein generating the list of predicted migration errors comprises:

identifying, using the information reconciliation engine and based on one or more of: the source information system, the target information system, and the migrated information, a correlation with one or more historical migrations; and identifying, using the information reconciliation engine and based on the correlation with the one or more historical migrations, the list of predicted migration errors.

12. The method of claim 11, wherein identifying the correlation with the one or more historical migrations includes identifying correlations with one or more of: source information systems corresponding to different formats than the source information system, or target information systems corresponding to different formats than the target information system.

13. The method of claim 9, wherein identifying the corrective actions comprises automatically identifying the corrective actions based on the historical information migration error information, the migrated information, and the errors.

14. One or more non-transitory computer-readable media storing instructions that, when executed by a computing platform comprising at least one processor, a communication interface, and memory, cause the computing platform to:

train, using historical information migration error information, an information reconciliation engine to predict information migration errors, wherein:

the information reconciliation engine is an artificial intelligence engine, and the artificial intelligence engine comprises: a decision tree model, bagging model, boosting model, random forest model, neural network, artificial neural network, support vector machine, classification model, clustering model, anomaly detection model, feature engineering model, and feature learning model;

detect migration of information from a source information system to a target information system, wherein a format corresponding to the source information system is different than a format corresponding to the target information system, and wherein the difference is based on different schema structures, variations in table definitions, variations in column names, variations in data types, variations in constraints, and variations in data dependencies;

generate, by inputting the migrated information into the information reconciliation engine, a list of predicted migration errors;

sample the migrated information to identify a list of real-time migration errors, wherein identifying the list of predicted migration errors and the list of real-time migration errors comprises identifying: missing records, missing rows, missing values, incorrect values, formatting issues, and broken relationships, and wherein sampling the migrated information comprises selecting a random subset of the migrated information without reviewing the migrated information in its entirety;

identify corrective actions to address the list of predicted migration errors and the list of real-time migration errors;

generate, based on the corrective actions, a configuration file;

execute, using the configuration file and on the migrated information, a reconciliation process, wherein the reconciliation process remediates errors on both the list of predicted migration errors and the list of real-time migration errors; and update, using a dynamic feedback loop and based on the configuration file, the information reconciliation engine.

15. The computing platform of claim 1, wherein sampling the migrated information comprises selecting a random subset of the migrated information without reviewing the migrated information in its entirety.

16. The computing platform of claim 1, wherein training the information reconciliation engine with the historical information migration error information comprises training the information reconciliation engine using migration exceptions, migration mismatches, migration error information, and migration pattern information.

17. The one or more non-transitory computer-readable media of claim 14, wherein training the information reconciliation engine with the historical information migration error information comprises training the information reconciliation engine using one or more of: migration exceptions, migration mismatches, migration error information, or migration pattern information.

18. The one or more non-transitory computer-readable media of claim 14, wherein generating the list of predicted migration errors comprises:

identifying, using the information reconciliation engine and based on one or more of: the source information system, the target information system, and the migrated information, a correlation with one or more historical migrations; and identifying, using the information reconciliation engine and based on the correlation with the one or more historical migrations, the list of predicted migration errors.

19. The one or more non-transitory computer-readable media of claim 18, wherein identifying the correlation with the one or more historical migrations includes identifying correlations with one or more of: source information systems corresponding to different formats than the source information system, or target information systems corresponding to different formats than the target information system.

20. The one or more non-transitory computer-readable media of claim 14, wherein identifying the corrective actions comprises automatically identifying the corrective actions based on the historical information migration error information, the migrated information, and the errors.

* * * * *